United States Patent [19]
Tsymberov

[11] Patent Number: 5,369,974
[45] Date of Patent: Dec. 6, 1994

[54] SUSPENSION TESTER AND METHOD
[75] Inventor: Anatoly Tsymberov, Ballwin, Mo.
[73] Assignee: Hunter Engineering Company, Bridgeton, Mo.
[21] Appl. No.: 974,249
[22] Filed: Nov. 10, 1992
[51] Int. Cl.⁵ ............................................. G01M 17/04
[52] U.S. Cl. ..................................... 73/11.08; 73/670
[58] Field of Search .................... 73/116, 11.07, 11.08, 73/865.3, 669, 670

[56] References Cited
U.S. PATENT DOCUMENTS

| | | | |
|---|---|---|---|
| 3,855,841 | 11/1974 | Hunter | 73/11.08 |
| 3,902,352 | 9/1975 | Buzzi | 63/11.08 |
| 3,937,058 | 2/1976 | Hilbrands | 73/11.08 |
| 4,002,051 | 1/1977 | Hilbrands | 73/11.08 |
| 4,589,273 | 5/1986 | Tamasi et al. | 73/11.08 |
| 4,703,645 | 11/1987 | Hudacsek et al. | 73/11.08 |
| 5,056,024 | 10/1991 | Stuyts | 73/11.08 |

Primary Examiner—Hezron E. Williams
Assistant Examiner—James M. Olsen
Attorney, Agent, or Firm—Polster, Lieder, Woodruff & Lucchesi

[57] ABSTRACT

The apparatus and method of the present invention is designed for testing dampers of a motor vehicle without removing the dampers from the vehicle. The apparatus includes a movable support for contacting the bottom surface of a tire associated with a damper to be tested and members for oscillating the movable support to impose vertical oscillations on the tire. Transducers sense the force applied by the tire to the support during oscillation of the support while the oscillating members are controlled to oscillate the support over a predetermined range of frequencies. Circuitry is provided responsive to the transducers for determining, as a function of the frequency of oscillation, the adhesion of the tire to the support and the phase angle of the response of the tire to the oscillation. The circuitry further determines from the phase angle at a single frequency the adequacy of the damping of the damper under test.

19 Claims, 4 Drawing Sheets

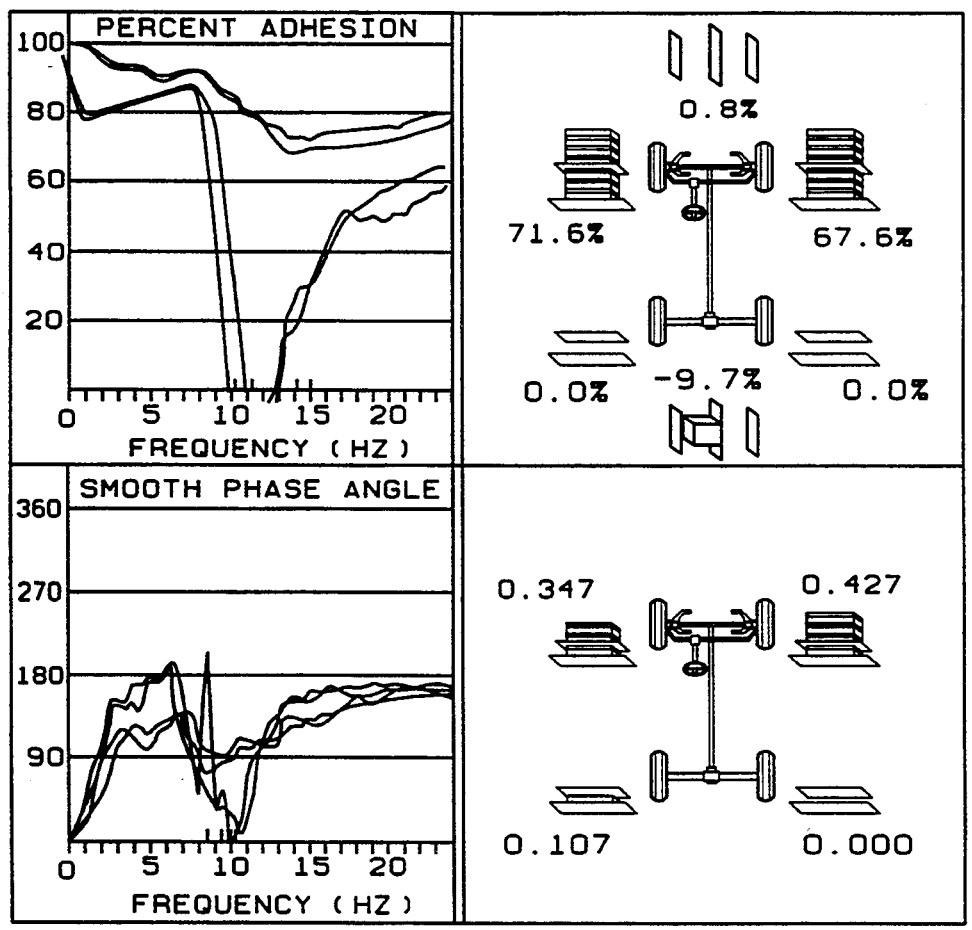

FIG. 5B

| SUMMARY | | | | |
|---|---|---|---|---|
| SUSPENSION | MEASURED | MARGINAL | FAILED | UNITS |
| FRONT AXLE | | | | |
| - LEFT ADHESION | 71.6 | 44.3 | 34.3 | % |
| - RIGHT ADHESION | 67.6 | 44.3 | 34.3 | % |
| - LEFT/RIGHT BALANCE | 0.8 | +/- 10.0 | | % |
| - LEFT DAMPING FACTOR | 0.347 | 0.200 | 0.100 | |
| - RIGHT DAMPING FACTOR | 0.427 | 0.200 | 0.100 | |
| REAR AXLE | | | | |
| - LEFT ADHESION | 0.0 | 31.2 | 20.9 | % |
| - RIGHT ADHESION | 0.0 | 31.2 | 20.9 | % |
| - LEFT/RIGHT BALANCE | -9.7 | +/- 10.0 | | % |
| - LEFT DAMPING FACTOR | 0.107 | 0.200 | 0.100 | |
| - RIGHT DAMPING FACTOR | 0.000 | 0.200 | 0.100 | |
| | | | | |
| VEHICLE DATA | LEFT | RIGHT | TOTAL | UNITS |
| FRONT AXLE WEIGHT | 924 | 825 | 1749 | LBS |
| REAR AXLE WEIGHT | 518 | 461 | 979 | LBS |
| WHEELBASE (ESTIMATED) | | | 100.4 | IN |
| C.G. HEIGHT (ESTIMATED) | | | 21.6 | IN |

FIG. 6

SUSPENSION TESTER AND METHOD

BACKGROUND OF THE INVENTION

This invention relates to testing of vehicles, and more particularly to testing dampers of automobiles and the like.

An automotive suspension is meant to provide both safety and comfort for the occupants. When a vehicle hits a bump in the pavement, the shock is taken up by various components of the vehicle. For example, the tire deforms as the suspension displaces, while most of the energy is stored in the suspension springs. The springs release this energy as a damped oscillation. Shock absorbers and struts (hereinafter referred to collectively as dampers) in motor vehicles serve to damp oscillations of the vehicle chassis resulting from travel over uneven surfaces and to reduce the magnitude of spring deflections in response to large bumps.

More specifically, a damper is a hydraulic mechanism positioned between sprung and unsprung masses to dissipate kinetic energy put into the system by bumps. Dampers provide desired ride characteristics, but also play a key role in keeping good tire-to-road contact essential for handling and safety. The dampers are probably the most versatile members of the group of components that affect ride and handling. The dampers control vibration and improve handling and load control. Without dampers, a car would go out of control at just twenty miles per hour and braking distance would increase. One faulty damper can cause unbalanced damping in suspension. Weak dampers allow the vehicle to continue to oscillate three or more times after the disturbance, causing an undesirable condition known as "float."

Some signs of a worn damper are (1) riders feeling carsick or tired, (2) excessive wear on the tires due to bumpy contact with the road, (3) vibration of steering, suspension and body parts, (4) car roll on turns, (5) nose-dive when braking, (6) veer in crosswinds, (7) headlights pitch up and down when driving over uneven surfaces, and (8) oil leakage from the dampers.

Dampers can be divided in the compression stage and in the rebound stage to either "firm" or "soft." For ride comfort, both compression and rebound stages should be "soft," but vertical body motion velocity could considerably exceed desirable limits. The damper rebound stage should be "firm" and compression should be "soft" to minimize vertical body motion velocity. But if vertical body velocity is low, usually on a smooth road, the damper compression stage should be "firm" and the rebound stage "soft", which should maximize adhesion. For ride safety, especially at wheel hop resonance, both the compression and rebound stages should be "firm."

Many car manufacturers try to compromise these factors for off-highway (rougher roads) driving using much more damping in rebound (two to six times) than in compression. This minimizes body motion velocity, but does not always maximize ride comfort. It also reduces the safety of the ride, especially at higher speeds.

Although the damper is a critical element in the safe operation of a vehicle, previously it has not been easily tested conclusively without completely removing it from the vehicle. Because of this, various methods have been proposed for testing the quality of a damper. One of these methods is for the mechanic to physically oscillate the vehicle by hand and observe the resulting oscillations of the vehicle. This method is less than satisfactory, since its results are not quantitative. Another method involves dropping the vehicle from a predetermined height to generate oscillation of the vehicle. This second method is superior to the first, but still could be improved since it reflects the response of the damper at a single frequency of excitation. Neither method provides testing over as wide a range of frequencies as might be desired, since both are basically low frequency tests.

One measure of the roadworthiness of a vehicle can be given in terms of the minimum amount of traction that the wheels will provide on uneven pavement. This number is called the "adhesion." This minimum traction allows the vehicle to maneuver despite bumps and other irregularities in the pavement. A method of testing adhesion has been proposed by the European Shock Absorber Manufacturers Association (EUSAMA). This method, set out in Recommendation TS-02-76 issued by EUSAMA includes the following requirements: (1) the vertical static contact force between the tire and the support member on which the tire associated with the damper to be tested is disposed is measured; (2) the supporting member is given a sinusoidal excitation to bring the vehicle into vibration; (3) adhesion is defined as the ratio of the minimum dynamic contact force measured on the supporting member at the wheel resonance frequency to the static contact force, expressed as a percentage; and (4) the proposed minimum frequency for exciting the supporting member is 24 Hz. Using the EUSAMA standards, when a test result of less than 20% adhesion is obtained, the damper is unsatisfactory; from 20% to 40% the damper is fair; above 40% adhesion, it is good, and over 60%, it is excellent.

The apparatus for performing the EUSAMA damper test includes a supporting member for the tire, and a drive motor with eccentric and spring for driving the supporting member. The frequency of vibration with this apparatus is increased into the range beyond the resonance frequency of the chassis (vehicle suspension). Then, the excitation frequency is gradually reduced. As the frequency is reduced, the frequency of vibration passes through the natural resonance or "wheel-hop" frequency.

In fact, there are a number of vibrational frequencies associated with a vehicle. Any vehicle is made up of a number of different components (rigid body, suspension, wheel, chassis, body panels, steering wheel, engine, etc.) with different vibrational behaviors. Vibration of the rigid bodies occurs at low frequencies, such as 0.5 to 5 hertz. Vibration of the suspension, on the other hand, occurs at frequencies of 5 hertz and above. In this regard, it should be noted that the primary difference between independent and linked suspensions is that while the independent suspension can be expected to have a single wheel hop resonance in the ten to twenty hertz frequency range, the linked suspension exhibits a pair of resonances. Both the suspension spring and the rubber suspension bushings play an important part in the actual vibrational levels transmitted across the suspension and entering the vehicle chassis at higher frequencies.

With respect to vibration of the vehicle chassis, for a fully dressed vehicle, the resonant frequencies are lower than for the free chassis due to the mass. The frequency range of vibration usually begins around ten hertz and can extend out through several hundred hertz. A vehicle chassis can possess a large number of different vibrational modes, some of which may have resonant frequencies in the range where wheel hop and other low frequency problems can occur.

It is known that low frequencies in the 0.5 to 30 Hz range are felt tactually by the human body, while vibrations in the range of from 20 Hz on up may be heard. Human beings are most sensitive to tactile vibrations in the range of four to eight hertz, but the sensitivity falls off rapidly as the frequency rises. Moreover, the greater the amplitude of the vibration, the greater the sensitivity of the person to that particular frequency of vibration.

Although the EUSAMA system is an improvement over prior methods, it can also be improved. The testing in the EUSAMA system is actually a test of the entire suspension system, not a test of the adequacy of the damper alone, and even then only one parameter, adhesion, is considered.

Ideally a test of a vehicle suspension should examine not only adhesion, but also actual adequacy of the damper under test, and the balance of adhesion from side to side of the vehicle. Prior suspension testers are not believed to test these various aspects of the acceptability of the suspension.

SUMMARY OF THE INVENTION

Among the various objects and features of the present invention may be noted the provision of a damper tester with improved performance.

Another object is the provision of such apparatus which tests more than one parameter of the suspension under test.

A third object is the provision of such apparatus which reduces the time heretofore needed to perform damper testing.

A fourth object is the provision of such an apparatus which provides reproducible test results.

A fifth object is the provision of such an apparatus which occupies a minimal amount of space.

Other objects and features will be in part apparent and in part pointed out hereinafter.

Briefly, the apparatus of the present invention is designed for testing dampers of a motor vehicle without removing the dampers from the vehicle. The apparatus includes a movable support for contacting the bottom surface of a tire associated with a damper to be tested and members for oscillating the movable support to impose vertical oscillations on the tire. Transducers sense the force applied by the tire to the support during oscillation of the support means while the oscillating members are controlled to oscillate the support means over a predetermined range of frequencies. Circuitry is provided responsive to the transducers for determining, as a function of the frequency of oscillation, the adhesion of the tire to the support and the phase angle of the response of the tire to the oscillation. The circuitry further determines from the phase angle at a single frequency the adequacy of the damping of the damper under test.

The method of the present invention includes the steps of placing a tire associated with a damper to be tested on a movable support, oscillating the movable support to impose vertical oscillations on the tire, and sensing the force applied by the tire to the support means during oscillation of the support means. The oscillations are controlled to oscillate the support over a predetermined range of frequencies. The method further includes the step of determining, as a function of the frequency of oscillation, the adhesion of the tire to the support and the phase angle of the response of the tire to the oscillation, and further determining from said phase angle at a single frequency the adequacy of the damping of the damper under test.

BRIEF DESCRIPTION OF THE DRAWINGS

FIGS. 4A–6 are representative display outputs of the apparatus of FIG. 2. Similar reference characters indicate similar parts throughout the several views of the drawings.

DESCRIPTION OF THE PREFERRED EMBODIMENT

Figure 1:
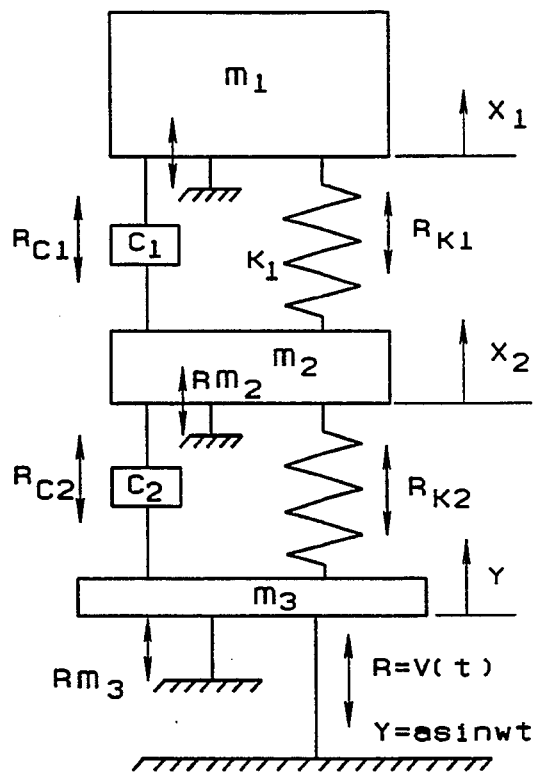
FIG. 1 is a diagrammatic representation of the masses and forces involved in the suspension tester of the present invention.

Mathematically, the suspension of a vehicle can be modeled as a two-degree-of-freedom system under a sinusoidal forcing function as shown in FIG. 1. The lowest mass (labelled m3 on FIG. 1) is exposed to the forcing function (labelled R), and represents the damper tester platform, while m1 and m2 represent the sprung and unsprung masses. The system is modeled by the following force-balance equations:

For m1: $Rm1 + Rc1 + Rk1 = 0$ \qquad (1)

For m2: $Rm2 + Rc2 + Rk2 - Rk1 - Rc1 = 0$ \qquad (2)

For m3: $Rm3 + R - Rk2 - Rc2 = 0$ \qquad (3)

Where:
 Rm1, Rm2, and Rm3 are the forces due to acceleration of the masses.
 Rc1 and Rc2 are the forces due to the dampers.
 Rk1 and Rk2 are the forces due to the springs.
 R is the force to the load cells (force sensing transducers).

The sprung mass is made up of the vehicle frame, body, and load. Vehicles with high sprung mass tend to be more comfortable than lighter vehicles because the larger mass requires a larger force to produce an uncomfortable acceleration. The unsprung mass is composed of the components on a car that move with the suspension as it deflects. These components include the wheel, tire, brakes, axle, suspension links, dampers, etc.

Figure 2:
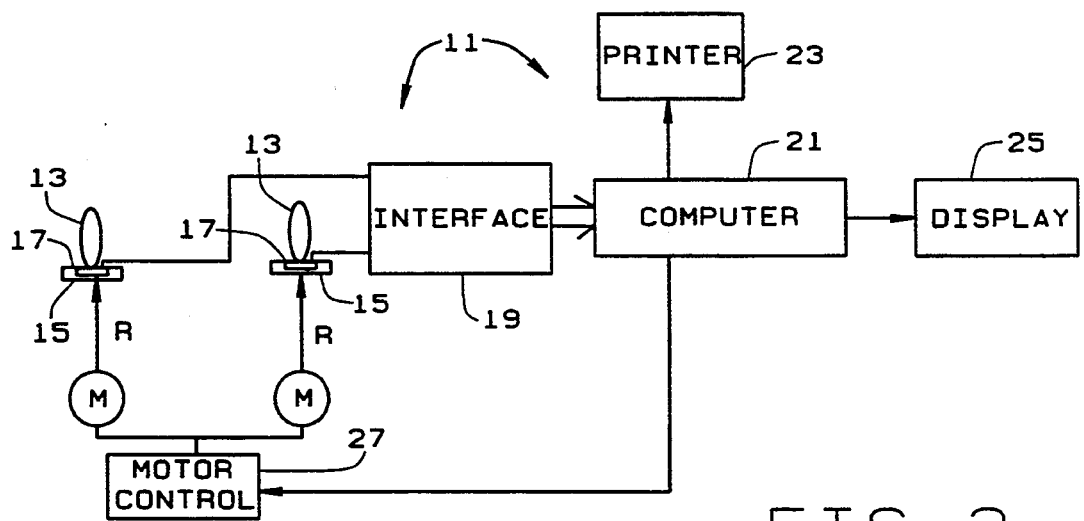
FIG. 2 is a block diagram of damper tester apparatus of the present invention.

Turning to FIG. 2, there is shown an apparatus 11 for performing the present invention to test the dampers (not shown) associated with vehicle wheels 13 (only two of which are shown). The apparatus includes a pair of supports 15, although any number of supports can be used up to the total number of tires of the vehicle. The supports have associated therewith suitable transducers (load cells) 17 for measuring the force applied by the vehicle through the tires to the supports. Each support is driven (as indicated by the arrows labelled "R" to oscillate vertically by a suitable motor M (and any desired drive train, not shown).

The particular mechanism used to impart oscillatory motion to the tires is not critical to the present invention. It is preferred that the mechanism include a base, eccentric shafts disposed with respect to the base to impose oscillatory motion on a pair of carriers, the motors, and a platform which moves with the carriers. By way of example, the counter-rotating eccentric shafts are mounted in one set of bearings on the base and another set of bearings mounted in the carrier. Each carrier is constrained so that it will move only in the vertical direction and is preloaded by two springs. The rotation of the eccentric shafts cause the carrier, load cells, and top plate assembly to oscillate vertically. The effect of the mass of the platform assembly is subtracted from the load cell readings electronically by inertia compensation. It should be understood, however, that any number of other mechanisms for imparting oscillatory motion to the tires could be used instead.

The outputs of load cells 17 are supplied through suitable interface circuitry 19 to a computer 21, which may be any suitable microprocessor. The computer controls one or more output devices (such as the printer 23 and display 25 shown) to provide test information to the mechanic. The computer also controls, through a suitable motor control circuit 27, motors M. More specifically, the computer controls the motors to vibrate supports 15 over a frequency range. The frequency range is approximately 25 Hz down to zero Hz. The motors initially oscillate the platforms up to the desired high frequency, such as 25 Hz, and the oscillations are then allowed to decrease in frequency. Measurements of magnitude and phase are taken as the frequencies decrease from 25 Hz down to zero.

Apparatus 11 is used to measure minimum adhesion (like conventional damper testers) and other suspension parameters such as minimum phase angle, minimum adhesive phase angle, the adhesion curve, the phase angle curve, and the ride comfort. As discussed above, adhesion is a non-dimensional number representing the minimum percentage of remnant vertical tire force to the pavement. The frequency at the minimum adhesion is called the wheel-hop frequency. This is the natural frequency of the unsprung mass, and in extreme cases the wheel can break contact with the platform during a test, thereby reading zero adhesion and giving an inaccurate phase angle.

This testing procedure was designed to eliminate the need for previous vehicle specifications. Looking at the sinusoidal waveform of the load on the shock absorber tester platform vs. time, adhesion is found by dividing the minimum load (measured by the load cells) by the weight at the wheel. Conceptually, this number states how well the tire stays in contact with the ground.

Figure 3:
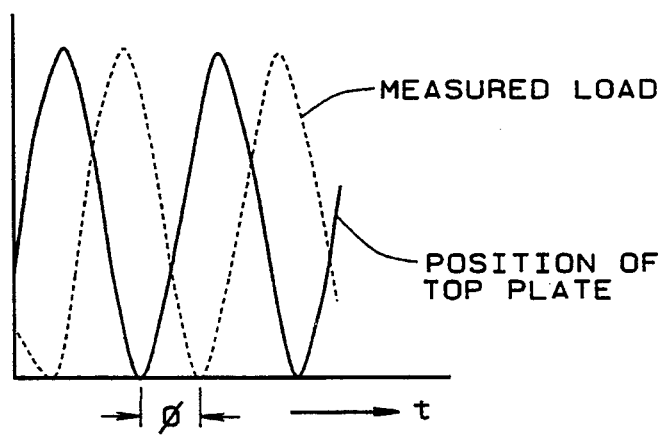
FIG. 3 is a graph illustrating the phase angle used in the present invention.

The phase angle is calculated by finding the angular difference between the position of the top plate and magnitude of the load as shown in FIG. 3. The phase angle represents the strength of the damper, with firm dampers having a large phase angle. The minimum phase angle is determined by apparatus 11 at the lowest point of the phase angle curve, usually occurring between 8 and 14 Hertz. Phase angle quantifies the relationship of the strength of the suspension damper.

Acceptable dampers generally have a minimum phase angle of at least thirty (30) degrees, whereas firm dampers have phase angles over sixty (60) degrees.

It should be understood that the tests of adhesion and phase angle performed by apparatus are affected by the following parameters:
 Vehicle Weight
 Tire Effect
 Damper Type and Conditions
 Suspension Type
 Damper Mounting
 Suspension and Damper Tolerances However, the present invention is not limited to any particular method of taking into account these various factors. It has been found, however, that to accurately assess the condition of the dampers it is very important to adjust the tires to the proper inflation pressure as recommended by the vehicle manufacturer. This pressure is usually between 28-35 p.s.i. It is also important that wheels on the same axle have equal tire pressures.

Some improper mounting of the dampers can be detected by the damper tester 11 by comparing the two wheels to each other. In the following table the top nuts on stud-mounted front dampers were not properly tightened. These new aftermarket dampers failed the phase angle criteria but did not fail the adhesion criteria. After proper installation the same dampers passed both criteria.

| Mounting | Adhesion (L/R) | Phase Angle (L/R) |
| --- | --- | --- |
| Improper | 56.3/44.9 | 28.1/20.2 |
| Proper | 61.4/59.5 | 46.3/38.0 |

Using both phase angle and adhesion data it is possible to quantify the following:
 Suspension Performance
 Damper Performance
 Suspension Balance The suspension balance is the comparison of the two dampers on the same axle. They should both have virtually identical characteristics. Excessive imbalance indicates that the dampers should be replaced as a pair.

The goal of the pass-fail criteria of computer 21 is to classify dampers as good, bad, or marginal. The primary criteria used in the present invention for the evaluation of the dampers was the phase angle. By examining the phase angle of the output measured with respect to the excitation, computer 21 can calculate the damping value of the damper under test. This damping value, unlike the adhesion value, which is also obtained with the present apparatus, directly reflects the quality of the damper under test. A minimum phase angle under thirty (30) degrees indicates that the damper should be replaced.

Since the minimum phase angle reading can give unexpectedly high minimum phase angles on vehicles with extremely low adhesions, adhesion is also analyzed with the present apparatus. On vehicles with adhesion lower than some percentage depending on the weight of the vehicle and other test parameters, the damper is considered to fail. Typical values for adhesion lower limits would vary from 18-28% or so depending upon car weight, axle, etc.

The present invention, therefore, examines up to two aspects of the dampers to determine whether the dampers are acceptable.

The present invention is more clearly illustrated by way of a series of examples, shown in FIGS. 4-6. These figures represent the output of printer 23 or display 25, which are used by the mechanic to determine whether a damper under test has passed. Although these outputs are shown in graphical form, it should be realized that the output could include alphanumeric information in a form readily understood by the user. The exact form of the output constitutes no part of the present invention.

Figure 4A:
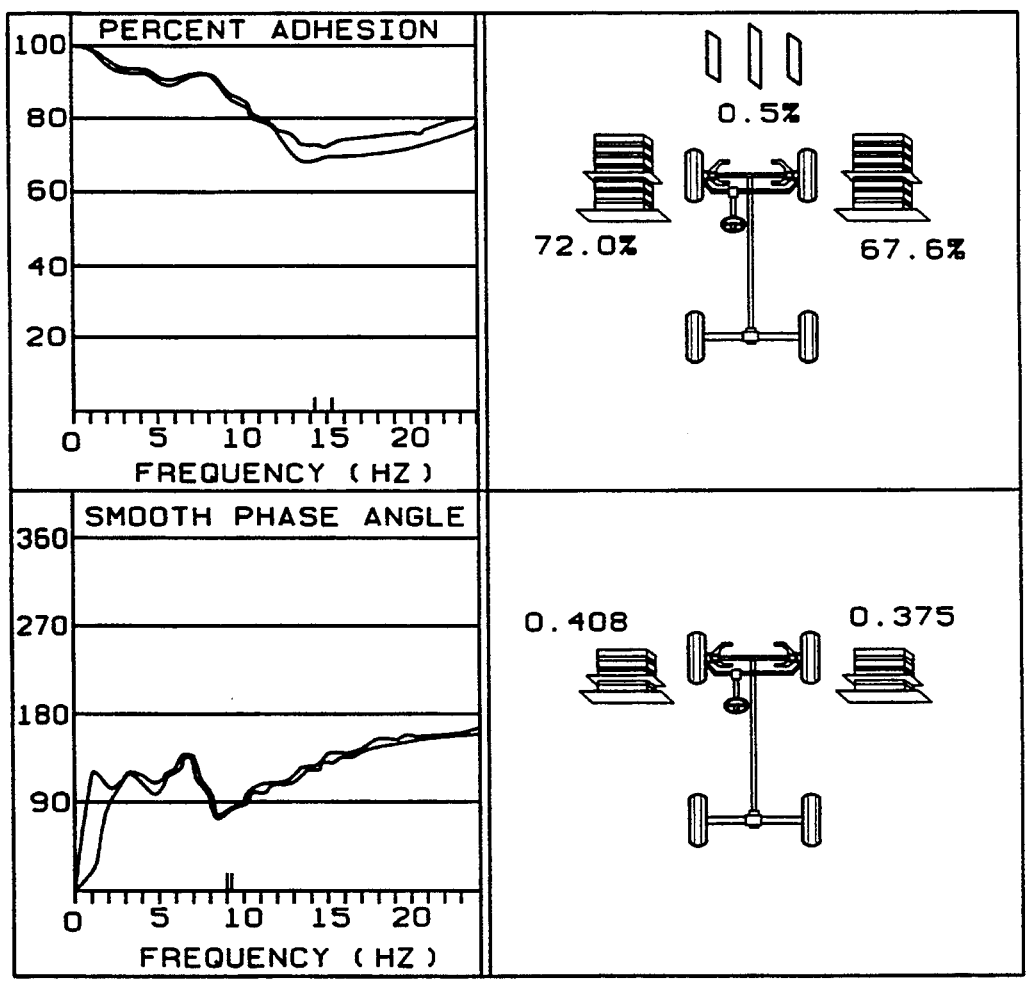
Figure 4B:
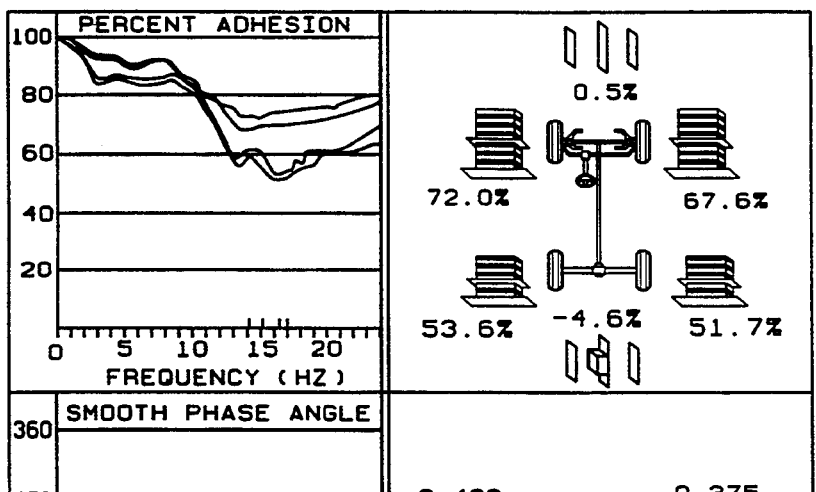

FIGS. 4A and 4B illustrate the damper test information provided by the present invention for a new vehicle, in this case a Citation. FIG. 4A contains the display of information for the front tires in graphical form, although it is understood that additional alphanumeric information may also be displayed. This information would include the pass/fail results calculated as described above. For example (see FIG. 6), the minimum adhesion required for a damper to pass is 34.3% (this number is illustrative only). FIG. 4B reveals that the left front damper had a passing minimum adhesion of 72.0% and the right front damper had a passing minimum adhesion of 67.6%.

The present invention also provides for failing dampers if the dampers are not balanced within ten percent for adhesion (when weight is taken into account). The new dampers of FIG. 4 easily pass this test. In addition the phase angle can be used to estimate the damping value of the damper under test.

FIG. 4B shows the results in graphical form for all four dampers. As can be readily seen from the graphs, all four dampers of this new vehicle have essentially the same response to the test.

Figure 5A:
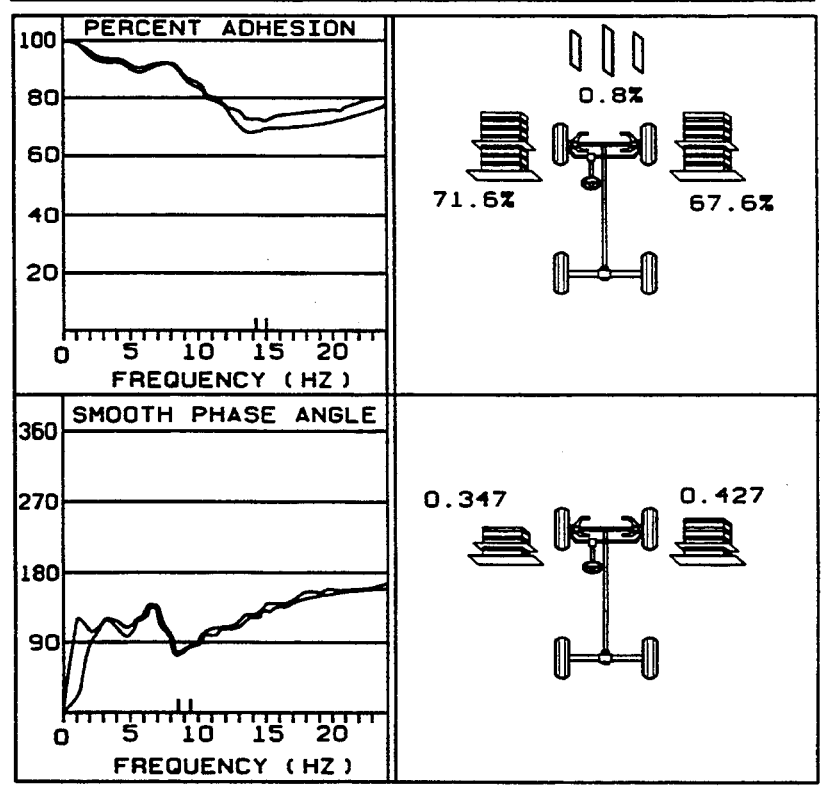

Turning to FIGS. 5A and 5B, the same output is shown for a similar car, with the rear dampers completely missing. The results of FIG. 5A, for the front dampers, are essentially the same as those of FIG. 4A. However, the results for the rear dampers are very different. Examination of the graphs of FIG. 5B clearly illustrate the defective nature of the (non-existent) rear dampers. FIG. 6, a summary output for the test of FIG. 5, illustrates the point clearly. While the front dampers easily pass all three tests, the rear dampers fail the adhesion test, and almost fails the left/right balance test.

From the above, it can be seen that the present invention readily and easily performs multiple damper tests, any of which can be used to fail the damper under test. Of course, the examples given herein are illustrative only and are not to be taken in a limiting sense.

What is claimed is:

1. Apparatus for testing suspension and dampers of a motor vehicle without removing the dampers from the vehicle comprising:
   a movable support for contacting the bottom surface of a motor vehicle tire associated with a damper to be tested;
   means for oscillating the movable support to impose vertical oscillations on the tire;
   means for sensing the force applied by the tire to the support during oscillation of the support means;
   means for controlling the oscillating means to oscillate the support means over a predetermined range of frequencies;
   means responsive to the sensing means for determining, as a function of the frequency of oscillation, the time response of the vehicle to the oscillation, said determining means further determining from said time response the adequacy of the damping of the damper under test, said determining means including a minimum phase threshold which the damper must meet for the damper to pass, said determining means comparing the time response of the vehicle with the minimum phase threshold to determine whether the damper under test passes.

2. The apparatus as set forth in claim 1, wherein the predetermined frequency range is from zero hertz to over twenty hertz.

3. The apparatus as set forth in claim 1 wherein the determining means includes a damping value threshold which the damper under test must meet in order to pass, said determining means determining the damping value of the damper under test from the time response of the vehicle to the oscillation, said determining means comparing the determined damping value with the damping value threshold to determine whether the damper under test passes.

4. The apparatus as set forth in claim 1 wherein the determining means further includes means for calculating the balance of damping for left and right dampers for the same vehicle, and a balance threshold which a pair of dampers under test must meet for the pair of dampers to pass, the determining means determining the balance of damping for left and right dampers for the same vehicle and comparing the determined balance with the balance threshold to determine whether the pair of dampers under test pass.

5. Apparatus for testing suspension and dampers of a motor vehicle without removing the dampers from the vehicle comprising:
   a movable support for contacting the bottom surface of a motor vehicle tire associated with a damper to be tested;
   means for oscillating the movable support to impose vertical oscillations on the tire;
   means for sensing the force applied by the tire to the support during oscillation of the support means;
   means for controlling the oscillating means to oscillate the support means over a predetermined range of frequencies;
   means responsive to the sensing means for determining, as a function of the frequency of oscillation, the time response of the vehicle to the oscillation, said determining means further determining from said time response the adequacy of the damping of the damper under test, said determining means including a minimum phase threshold which the damper must meet for the damper to pass, said determining means comparing the time response of the vehicle with the minimum phase threshold to determine whether the damper under lest passes;
   said determining means estimating the damping value of the damper under test from the time response at a single frequency.

6. Apparatus for testing suspension and dampers of a motor vehicle without removing the dampers from the vehicle comprising:
   a movable support for contacting the bottom surface of a motor vehicle tire associated with a damper to be tested;
   means for oscillating the movable support to impose vertical oscillations on the tire;
   means for sensing the force applied by the tire to the support during oscillation of the support means;
   means for controlling the oscillating means to oscillate the support means over a predetermined range of frequencies;
   means responsive to the sensing means for determining, as a function of the frequency of oscillation, the time response of the vehicle to the oscillation, said determining means further determining from said time response the adequacy of the damping of the damper under test, said determining means including a minimum phase threshold which the damper must meet for the damper to pass, said determining means comparing the time response of the vehicle with the minimum phase threshold to determine whether the damper under test passes;

said determining means including means for determining as a function of the frequency of oscillation the adhesion of the tire to the support and further including an adhesion threshold which the damper under test must meet in order to pass.

7. The apparatus as set forth in claim 6 wherein the minimum measured value of adhesion for a damper under test must meet the adhesion threshold for the damper to pass.

8. Apparatus for testing suspension and dampers of a motor vehicle without removing the dampers from the vehicle comprising:
a movable support for contacting the bottom surface of a motor vehicle tire associated with a damper to be tested;
means for oscillating the movable support to impose vertical oscillations on the tire;
means for sensing the force applied by the tire to the support during oscillation of the support means;
means for controlling the oscillating means to oscillate the support means over a predetermined range of frequencies;
means responsive to the sensing means for determining, as a function of the frequency of oscillation, the time response of the vehicle to the oscillation, said determining means further determining from said time response the adequacy of the damping of the damper under test, said determining means including a minimum phase threshold which the damper must meet for the damper to pass, said determining means comparing the time response of the vehicle with the minimum phase threshold to determine whether the damper under test passes;
said determining means including means for determining the adhesion of the tire to the support.

9. Apparatus for testing suspension and dampers of a motor vehicle without removing the dampers from the vehicle comprising:
a movable support for contacting the bottom surface of a motor vehicle tire associated with a damper to be tested;
means for oscillating the movable support to impose vertical oscillations on the tire;
means for sensing the force applied by the tire to the support during oscillation of the support means;
means for controlling the oscillating means to oscillate the support means over a predetermined range of frequencies;
means responsive to the sensing means for determining, as a function of the frequency of oscillation, the time response of the vehicle to the oscillation, said determining means further determining from said time response the adequacy of the damping of the damper under test, said determining means including a minimum phase threshold which the damper must meet for the damper to pass, said determining means comparing the time response of the vehicle with the minimum phase threshold to determine whether the damper under test passes;
said determining means further including means for calculating the balance of adhesion for left and right dampers for the same vehicle axle, and an adhesion balance threshold which a pair of dampers under test must meet for the pair of dampers to pass.

10. A method of testing suspensions and dampers of a motor vehicle without removing the dampers from the vehicle, said method comprising the steps of:
placing a tire associated with a damper to be tested on a movable support;
oscillating the movable support to impose vertical oscillations on the tire;
sensing the force applied by the tire to the support means during oscillation of the support means;
controlling the oscillations to oscillate the support over a predetermined range of frequencies;
electronically determining, as a function of the frequency of oscillation, the time response of the vehicle to the oscillation, and further electronically determining from said time response at a frequency the adequacy of the damping of the damper under test, said determining step including comparing the time response of the vehicle with a minimum phase threshold to determine whether the damper under test passes.

11. The method as set forth in claim 10 wherein the predetermined frequency range is from zero hertz to over twenty hertz.

12. The method as set forth in claim 10 wherein the damping value is electronically calculated from the time response.

13. The method as set forth in claim 10 further including failing a damper under test unless it meets a damping value threshold.

14. The method as set forth in claim 10 further including electronically calculating the balance of damping for left and right dampers for the same vehicle axle, and failing a pair of dampers unless they meet a damping balance threshold.

15. A method of testing suspensions and dampers of a motor vehicle without removing the dampers from the vehicle, said method comprising the steps of:
placing a tire associated with a damper to be tested on a movable support;
oscillating the movable support to impose vertical oscillations on the tire;
sensing the force applied by the tire to the support means during oscillation of the support means;
controlling the oscillations to oscillate the support over a predetermined range of frequencies;
determining, as a function of the frequency of oscillation, the time response of the vehicle to the oscillation, and further determining from said time response at a frequency the adequacy of the damping of the damper under test, said determining step including comparing the time response of the vehicle with a minimum phase threshold to determine whether the damper under test passes; and
failing the damper under test unless it meets an adhesion threshold.

16. The method as set forth in claim 15 wherein the minimum measured value of adhesion for a damper under test must exceed the adhesion threshold for the damper to pass.

17. A method of testing suspensions and dampers of a motor vehicle without removing the dampers from the vehicle, said method comprising the steps of:
placing a tire associated with a damper to be tested on a movable support;
oscillating the movable support to impose vertical oscillations on the tire;
sensing the force applied by the tire to the support means during oscillation of the support means;
controlling the oscillations to oscillate the support over a predetermined range of frequencies;

determining, as a function of the frequency of oscillation, the time response of the vehicle to the oscillation, and further determining from said time response at a frequency the adequacy of the damping of the damper under test;

determining, as a function of frequency, the adhesion of the tire to the support;

calculating the balance of adhesion for left and right dampers for the same vehicle; and failing a pair of dampers unless they meet an adhesion balance threshold.

18. The method as set forth in claim 17 further including failing a damper unless it meets an adhesion balance threshold which is a function of vehicle weight.

19. The method as set forth in claim 17 further including failing a pair of dampers unless it meets an adhesion balance threshold which is a function of tire axle.

* * * * *